(12) United States Patent
Marsala et al.

(10) Patent No.: US 8,573,513 B2
(45) Date of Patent: Nov. 5, 2013

(54) FUEL SYSTEM INLET CHECK VALVE WITH FLAME ARRESTING FEATURE

(75) Inventors: Vincent J. Marsala, Auburn Hills, MI (US); Scott W. Jorgensen, Bloomfield Township, MI (US); Robert Halsall, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 138 days.

(21) Appl. No.: 13/117,701

(22) Filed: May 27, 2011

(65) Prior Publication Data
US 2012/0298385 A1 Nov. 29, 2012

(51) Int. Cl.
*F02M 61/20* (2006.01)
(52) U.S. Cl.
USPC .................................. 239/533.9; 239/533.1
(58) Field of Classification Search
USPC ......... 239/533.2, 533.3, 533.7, 533.9, 88, 89, 239/91, 95, 533.1; 137/511, 512, 528; 123/525, 527, 267
See application file for complete search history.

(56) References Cited

U.S. PATENT DOCUMENTS

| | | | | |
|---|---|---|---|---|
| 4,265,375 A | * | 5/1981 | Flider | 222/189.01 |
| 4,736,718 A | * | 4/1988 | Linder | 123/267 |
| 5,685,334 A | * | 11/1997 | Hagan | 137/514.7 |
| 6,019,348 A | | 2/2000 | Powell | |
| 6,386,244 B2 | | 5/2002 | Brown et al. | |
| 6,988,492 B2 | * | 1/2006 | Shetley | 123/525 |
| 7,317,598 B2 | * | 1/2008 | Magnier | 361/37 |
| 2006/0185760 A1 | | 8/2006 | Matsuzaki et al. | |
| 2008/0271814 A1 | | 11/2008 | Wilton et al. | |

* cited by examiner

*Primary Examiner* — Davis Hwu (57) ABSTRACT

An inlet check valve assembly with flame arresting feature. An internal flame arresting feature utilizes a flame arrester body attached to a valve member which protrudes into the valve throat. An external flame arresting feature utilizes a hood concentrically disposed relative to the valve member. The flame arresting feature is configured relative to movement of the valve member with respect to the throat such that fluidic communication between the fuel fill pipe and the fuel tank is limited to less than the minimum flame propagation distance of the fuel and air mixture in which a combustible mixture may exist in the fuel fill pipe, whereby any flame front in the fuel fill pipe will quench thereat before reaching the fuel tank.

4 Claims, 8 Drawing Sheets

FUEL SYSTEM INLET CHECK VALVE WITH FLAME ARRESTING FEATURE

TECHNICAL FIELD

The present invention relates to fuel fill pipes of motor vehicle fuel system, and more particularly to the inlet check valve assembly thereof. Still more particularly, the present invention relates to a fuel fill pipe check valve having a flame arresting feature integrated therewith.

BACKGROUND OF THE INVENTION

Fuel systems of motor vehicles, particularly passenger cars and light trucks, utilize a fuel fill pipe which provides a conduit to channel fuel from an exteriorly accessible, selectively closable opening to the fuel tank during a refueling event. The fuel systems of motor vehicles powered with high concentrations of alcohol blended fuels (i.e., greater than twenty percent alcohol blended with gasoline) typically incorporate a flame arrester in the fuel fill pipe disposed up stream of the fuel tank. The flame arrester prevents an ignited mixture of flammable vapors originating at the fuel fill pipe inlet from reaching the fuel tank during refueling. Combustible vapors in alcohol blended fuels can occur at much higher temperatures than would occur for gasoline fuels which contain low concentrations of alcohol, thereby driving the rationale for inclusion of a flame arrester in the fuel system. Flame arresters are used with flex fuel vehicles and other motor vehicles where combustible mixtures of fuel and air can exist in the vehicle fuel system at higher ambient temperatures than regular unblended gasoline. The flame arrester used in the prior art has certain drawbacks, including its being an added piece within the fuel fill pipe, causing flow restriction to the fill pipe, and affecting fuel filling quality. An example of an advanced flame arrester is described in U.S. Patent Application Publication 2008/0271814-A1, published on Nov. 6, 2008.

Motor vehicles equipped with onboard refueling vapor recovery systems utilize a normally biased closed inlet check valve assembly for the fuel system which provides sealing of the fuel chamber of the fuel tank from the fuel fill pipe in reverse of the fill flow direction, wherein the inlet check valve assembly has a valve member that is movable between a fully closed state and a fully open state, the valve member being biased to the normally closed state by light spring force, but, when acted upon by flow of fuel, moves toward the fully open state against the spring biasing.

Figures 1, 2:
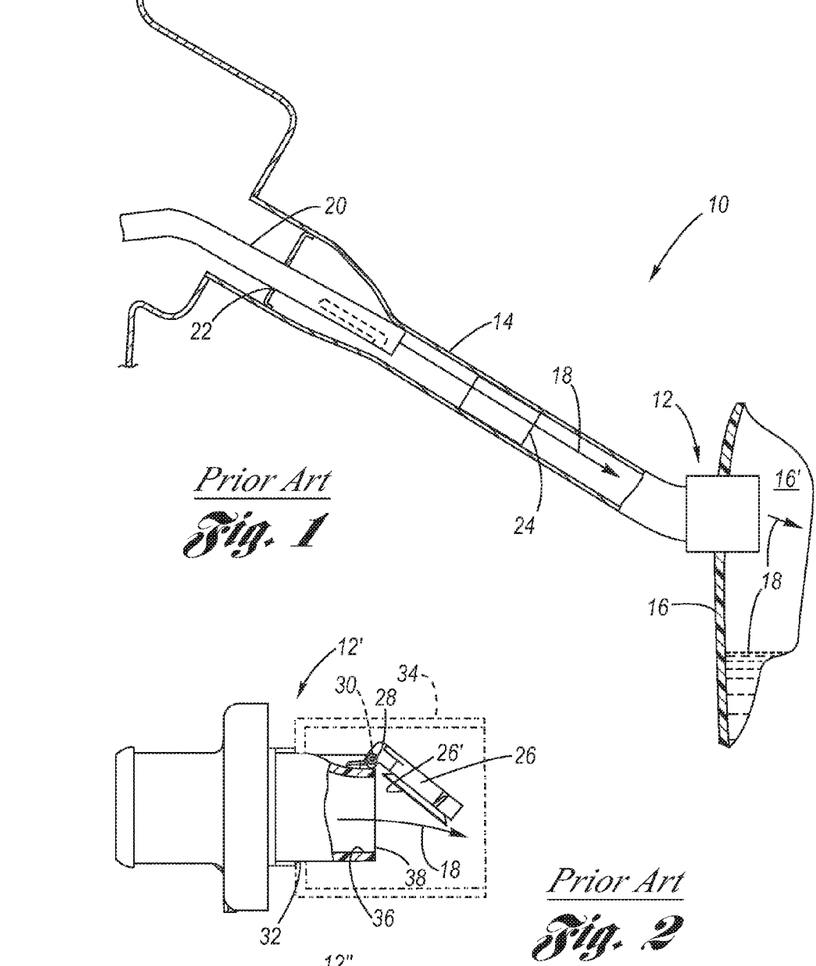
FIG. 1 is a partly sectional, schematic view of a prior art fuel system of a motor vehicle, shown in the process of refueling.
FIG. 2 is a partly sectional side view of a prior art flapper type valve member inlet check valve assembly.
Figure 3:
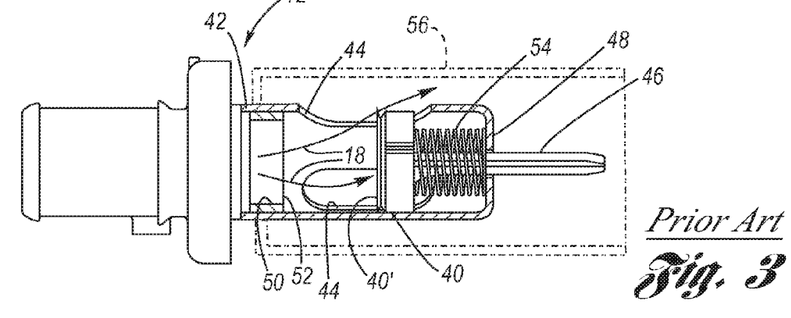
FIG. 3 is a partly sectional side view of a prior art shuttle body type valve member inlet check valve assembly.

Referring now to FIGS. 1 through 3, FIG. 1 shows a prior art fuel system 10, applicable by way of example to a flex fuel motor vehicle, incorporating a conventional inlet check valve assembly 12 which may be of a "flapper" type valve member as show by way of example at FIG. 2, or may be of a "shuttle body" type valve member, as shown by way of example at FIG. 3. The inlet check valve assembly 12 is generally disposed at the interface of the fuel fill pipe 14 and the fuel tank 16. The fuel fill pipe 14 provides a conduit to channel fuel 18 being dispensed by a fuel pump nozzle 20 via an exteriorly accessible, selectively closable opening 22 thereof to the fuel chamber 16' of the fuel tank 16 during a refueling episode. A conventional flame arrester 24 is disposed in the fuel fill pipe 14 between the opening 22 and the inlet check valve assembly 12.

A conventional flapper type valve member inlet check valve assembly 12' in the fully open state is shown at FIG. 2. The valve member is a flapper (also referred to as a valve door) 26 which carries a seal 26'. The flapper 26 rotates (or pivots) on a spring biased pivot 28 connected with a valve tube 32 relative to the throat in response to flow of fuel 18 and biasing by a spring 30. The valve tube 32 is connected to a throat 36 terminating at a throat mouth 38 which is sealed closed by the seal 26' when the flapper 26 is at a closed state in response to biasing by the spring 30. When fuel 18 is introduced into the fuel fill pipe (see FIG. 1), pressure exerted on the flapper 26 by the fuel flow overcomes the spring biasing and the flapper assumes the fully open state, as shown. A shroud 34, shown in phantom, may be disposed concentrically in relation to the valve tube at the fuel tank side of the inlet check valve assembly 12'.

A conventional shuttle type valve member inlet check valve 12" in the fully open state is shown at FIG. 3. The valve member is a shuttle body (also referred to as a valve plunger) 40 which carries a seal 40'. A valve tube 42 has a plurality of fuel dispensing apertures 44 and receives a guide bar 46 of the shuttle body 40 at a partly closed distal end 48. The valve tube 42 is connected to a throat 50 terminating at a throat mouth 52. The shuttle body 40 axially moves (slides) in the valve tube 42 relative to the throat in response to flow of fuel 18 and biasing by a spring 54. The throat mouth 52 is sealed closed by the seal 40' when the shuttle body 40 is at a closed state in response to biasing by the spring 54. When fuel 18 is introduced into the fuel fill pipe (see FIG. 1), pressure exerted by the fuel flow on the shuttle body 40 overcomes the spring biasing and the shuttle body assumes the fully open state, as shown. A shroud 56, shown in phantom, may be disposed concentrically in relation to the valve tube at the fuel tank side of the inlet check valve assembly 12".

It is a well known principal of chemistry that a complete combustion reaction with no excess requires a particular ratio of fuel to oxidant defined by the reactants, known as the stoichiometry of the reaction. Accordingly, the combustibility of a fuel and air mixture depends upon the ratio of fuel to air. In an environment in which the ratio is becoming progressively richer, that is, proportionally higher in fuel and lower in air, eventually a point is reached whereat the mixture will no longer support combustion.

The science behind arresting (or quenching) a flame depends upon the ability to remove a flame's heat by providing small passages (with length as a secondary factor) for the flame front to pass therethrough. For fuel and air mixtures, the minimum flame propagation distance between two surfaces in which a flame can still propagate therebetween is a function of both the chemical being combusted (the fuel) and its concentration with respect to air (more precisely, the oxygen in the air). When the distance between the surfaces is reduced below that minimum flame propagation distance, then the flame will be quenched and combustion cannot proceed past that point, even if the fuel to air ratio supports combustion.

Normally, the minimum flame propagation distance is somewhat on the rich side of stoichiometry of the mixture and may be, for example, on the order of about 0.06 to about 0.1 inch. However, for relatively hotter gases, higher pressure gases, and less conductive gases, a smaller minimum flame propagation distance may be required for flame arresting. Geometry also plays an important role. For example, two needle-like point shaped surfaces have a much smaller minimum flame propagation distance than, by way of comparison, the walls of a slit or a tube which flame arrest at the greatest separation therebetween. The range of minimum flame propagation distance for arresting a flame applicable to combustible mixtures of gasoline and air in the atmosphere is from about 0.07 to more than about 0.14 inches. In actual practice of motor vehicle fuels, the fuel and air mixture will be a combination of primarily butane and pentane isomers with some hexane and very small amounts of heavier hydrocarbons, all of which have minimum flame propagation distances for combustible mixtures of fuel and air, generally greater than about 0.1 inch.

In that the fuel to air mixture in a motor vehicle fill pipe will be a quite rich fuel to air ratio (high in fuel and fuel vapor and low in air), the minimum flame propagation distance of this fuel and air mixture in the fuel fill pipe will be accordingly increased over a stoichiometric ratio of fuel to air. However, to protect against untoward flame incidents in extreme cold and with oxygenated fuels, flame arresters utilize the smallest determined minimum flame propagation distance as being applicable.

For further information on flame arresting (or quenching), see NACA report 1300 of 1959, "Basic Considerations in the Combustion of Hydrocarbon Fuels with Air" is the 1959 classic by Barnett and Hibbard, (note of interest: the National Advisory Committee for Aeronautics (NACA) was predecessor to the present National Aeronautics and Space Administration (NASA)).

In view of the foregoing, it would be very beneficial if somehow a separate piece flame arrester as it is known in the prior art could be eliminated, and yet flame arresting/quenching still be provided by the fuel system.

SUMMARY OF THE INVENTION

The present invention is an inlet check valve assembly incorporating a flame arresting feature which obviates the need for a separate piece flame arrester disposed in the fuel fill pipe as is practiced in the prior art, as for example shown at FIG. 1. Accordingly, the inlet check valve assembly inherently acts as a flame arrester, with the attendant advantages of eliminating an additional piece in the fill pipe, lessening fuel flow restriction, and improving fuel fill quality in motor vehicle fuel systems, including flex fuel motor vehicles.

The inlet check valve assembly with flame arresting feature according to the present invention is an inlet check valve assembly having an integrated flame arresting feature whereby movement of the valve member (i.e., the flapper or the shuttle body) of the inlet check valve assembly in response to combustion of the mixture in the fuel fill tank is such that fluidic communication through the inlet valve assembly is limited by the flame arresting feature to less than the minimum flame propagation distance of the fuel and air mixture during the time that combustion of a combustible mixture may be present in the fuel fill pipe, resulting in any flame front in the fuel fill pipe being quenched thereat without reaching the fuel tank.

The flame arresting feature according to the present invention may be either internal or external with respect to the throat of the inlet check valve assembly. The internal flame arresting feature utilizes a flame arrester body connected with the valve member which protrudes into the throat of the inlet check valve, whereas the external flame arresting feature utilizes a hood concentrically adjacent the valve member, wherein both the internal and external flame arresting features provide increased valve member travel which is predetermined in order to delay full opening of the inlet check valve assembly. Both the internal and external flame arresting features are configured relative to the movement of the valve member in response to combustion of the mixture within the fuel fill pipe such that fluidic communication is limited by the flame arresting feature to less than the minimum flame propagation distance of the fuel and air mixture during the time that combustion of a combustible mixture may be present in the fuel fill pipe. As such, any flame front in the fuel fill pipe will quench thereat without reaching the fuel tank.

Operatively, when vapor pressure is sufficiently low due either to low temperature or very involatile fuel, a flammable mixture can exist within the fuel fill pipe and fuel tank. If an ignition source were to exist external to the vehicle at the time the fuel fill cap is removed (e.g., a static electric discharge or a lit cigarette), the mixture within the fill pipe may ignite. If so, the flame front produced could travel down the fuel fill pipe to the inlet check valve assembly, creating pressure thereat which unseats the valve member from its closed state to a predetermined intermediately open state. During this critical time, the flame arresting feature provides a separation distance through the inlet check valve assembly that is less than the minimum flame propagation distance of the fuel and air mixture, whereby any flame front in the fuel fill pipe will be quenched thereat and not be able to get therepast to the fuel tank. The fuel to air ratio of the mixture inside the fuel fill pipe will change rapidly to the point were combustion is not longer supported, or the flame is starved of a combustible mixture, whereby henceforth need of flame quenching is obviated. In this regard, the time duration of an episode from beginning to when the fuel to air ratio of the fuel and air mixture is such as to transition from a combustible mixture to a noncombustible mixture can never be longer than the time duration for the valve member to move from the fully closed state to the intermediately open state, this being determined, for example, by modeling or empirical testing.

In a flapper type valve member inlet check valve assembly, the flapper (or valve door) is associated with the flame arresting feature. For the internal flame arresting feature, the flapper carries the flame arrester body which protrudes into the throat of the inlet check valve assembly when the flapper is at the fully closed state. For the external flame arresting feature, the flapper is disposed in concentric relation to an adjacent a hood. Both the flame arrester body and the hood are configured such that during the pivoting movement of the flapper, fluidic communication through the inlet check valve assembly is limited during the time of movement of the flapper between the fully closed state and the intermediately open state, wherein the separation between the flame arrester body and the throat, and/or between the flapper and the hood, is less than the minimum flame propagation distance of the fuel and air mixture.

Accordingly, for the critical duration of time when the fuel to air ratio of the fuel and air mixture is such that a combustible mixture may exist in the fuel fill pipe, starting from when ignition of the mixture first occurs and the flapper initially unseats from the closed state to when the fuel to air ratio of the fuel and air mixture is such that it transitions into a noncombustible mixture and the flapper is at the intermediately open state, the separation between the flame arrester body and the throat, and/or between the flapper and the hood, is spatially limited to less than the minimum flame propagation distance of the mixture.

In a shuttle body type valve member inlet check valve assembly, the shuttle body (or valve plunger) is associated with the flame arresting feature. For the internal flame arresting feature, the shuttle body carries a flame arrester body which protrudes into the throat of the inlet check valve assembly when the shuttle body is at the fully closed state. For the external flame arresting feature, the shuttle body is disposed in concentric relation to an adjacent hood. Both the flame arrester body and the hood are configured such that during the sliding movement of the shuttle body, fluidic communication through the inlet check valve assembly is limited during the time of movement of the shuttle body between the fully closed state and the intermediately open state, wherein the separation of the flame arrester body from the throat and/or the shuttle body from the hood is less than the minimum flame propagation distance of the fuel and air mixture.

Accordingly, for the critical duration of time when the air ratio of the fuel and air mixture is such that a combustible mixture may exist in the fuel fill pipe, starting from when ignition of the mixture is first introduced and the shuttle body initially unseats from the closed state to when the fuel to air ratio of the fuel and air mixture is such that it transitions into a noncombustible mixture and the shuttle body is at the intermediately open state, the separation between the flame arrester body and the throat. and/or between the shuttle body and the hood, is less than the minimum flame propagation distance of the mixture.

Accordingly, it is an object of the present invention to provide an inlet check valve assembly with flame arresting feature for a fuel system of a motor vehicle that serves as both a fuel inlet check valve and a flame arrester for motor vehicle fuel systems, including flex fuel motor vehicles.

This and additional objects, features and advantages of the present invention will become clearer from the following specification of a preferred embodiment.

BRIEF DESCRIPTION OF THE DRAWINGS

FIG. 7 is an end view, seen along line 7-7 of FIG. 6.

DESCRIPTION OF THE PREFERRED EMBODIMENT

Figure 4:
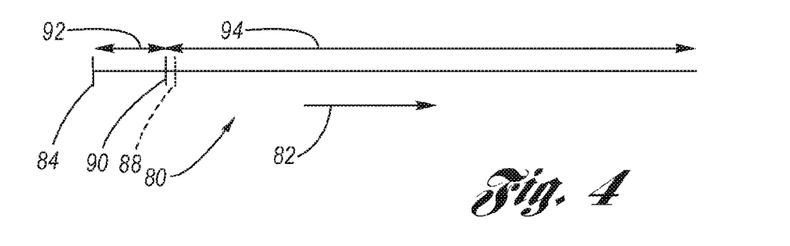
FIG. 4 is a schematic timeline of operation of the present invention.
Figure 9:
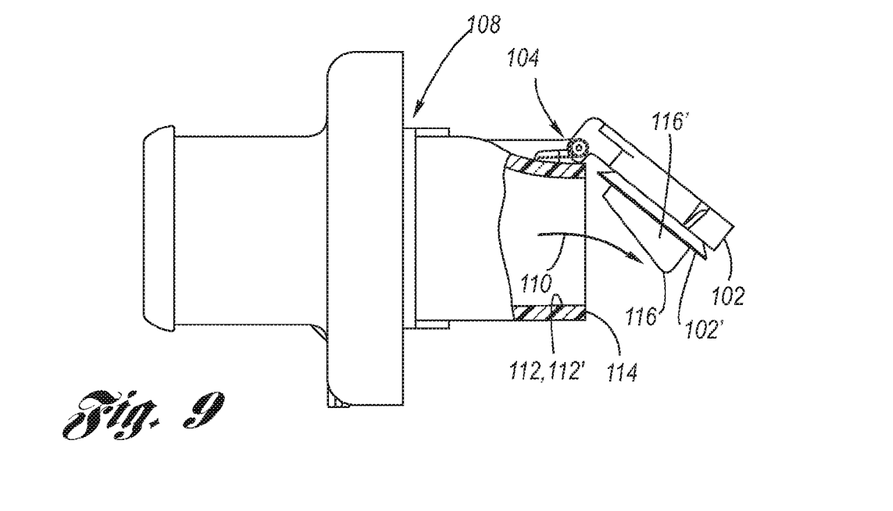
FIG. 9 is a partly sectional view of the flapper type valve member inlet check valve assembly with flame arresting feature similar to FIG. 6, wherein now the flapper is at a fully open state.
Figure 10:
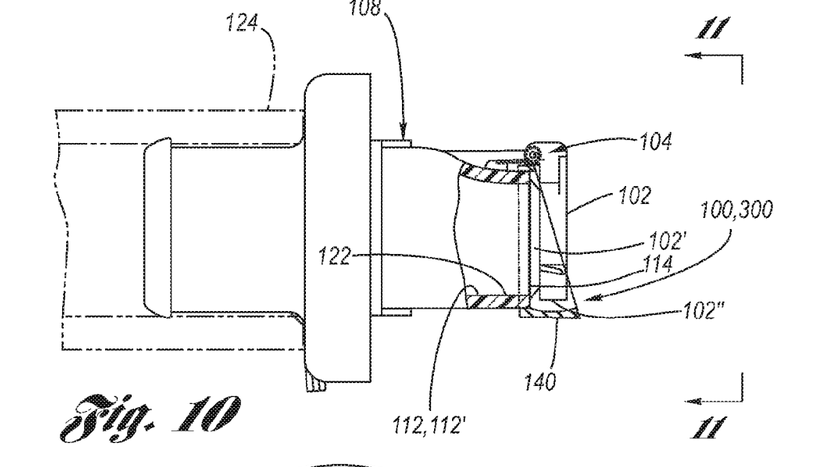
FIG. 10 is a partly sectional view of the flapper type valve member inlet check valve assembly with flame arresting feature, wherein an external flame arresting feature is depicted and the flapper is shown at the closed state.
Figure 11:
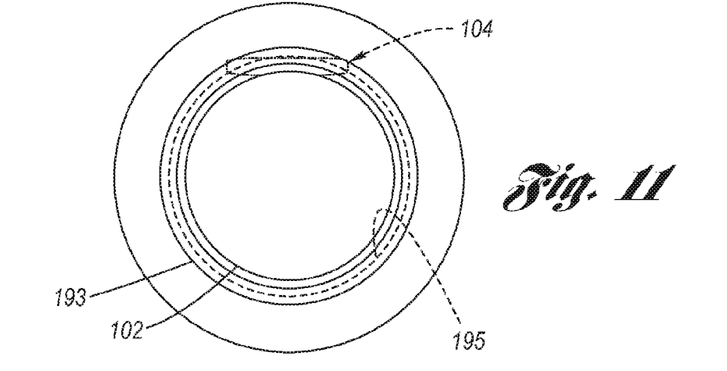
FIG. 11 is an end view, seen along line 11-11 of FIG. 10.
Figure 12:
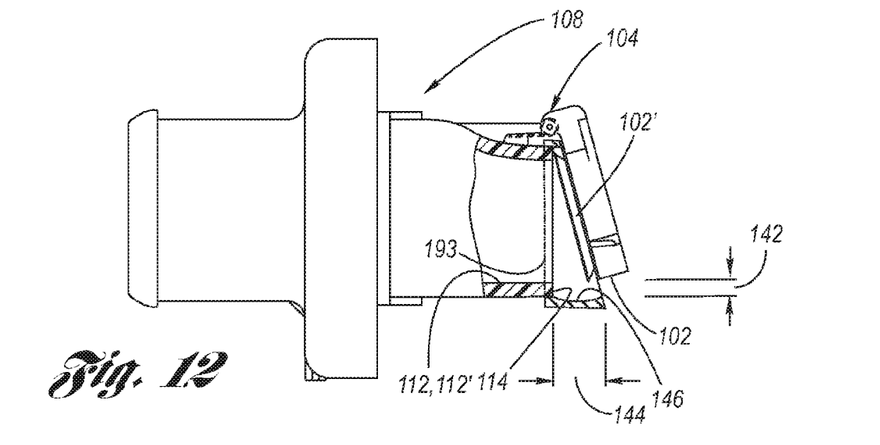
FIG. 12 is a partly sectional view of the flapper type valve member inlet check valve assembly with flame arresting feature similar to FIG. 10, wherein now the flapper is at an intermediately open state.
Figure 13:
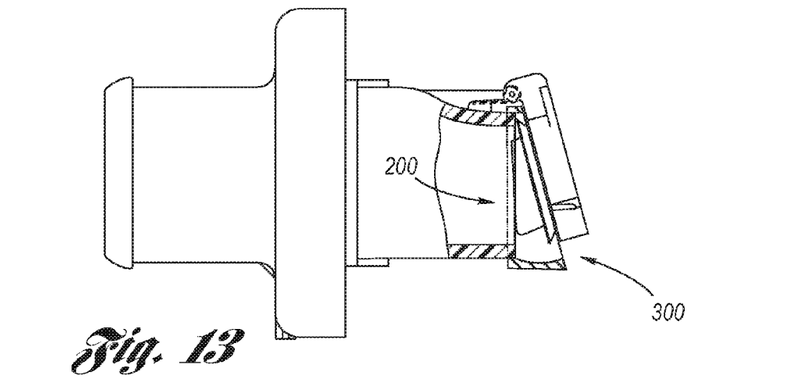
FIG. 13 is a partly sectional view of the flapper type valve member inlet check valve assembly with flame arresting feature, wherein the flapper is at an intermediately open state and both internal and external flame arresting features are provided.
Figure 20:
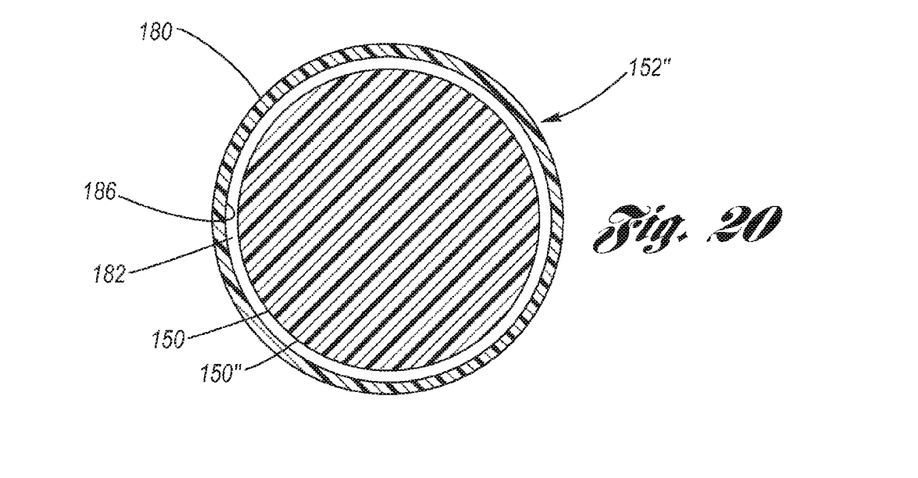
FIG. 20 is a sectional view, seen along line 20-20 of FIG. 19.
Figure 21:
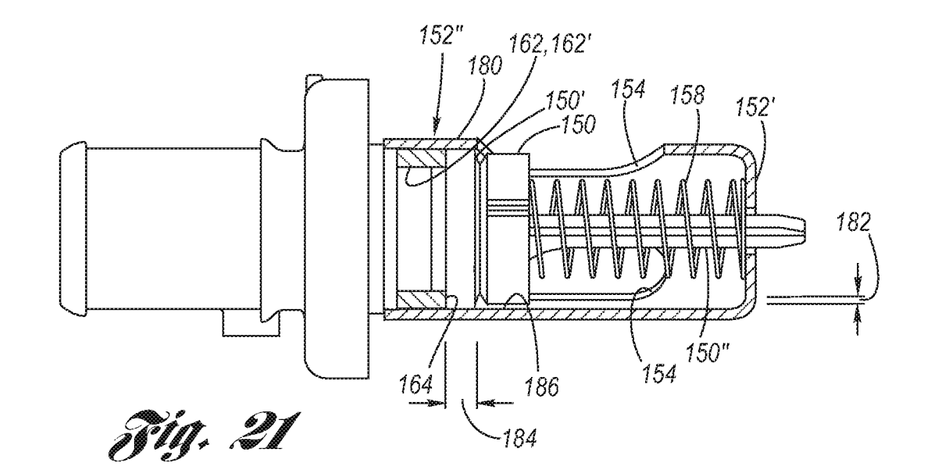
FIG. 21 is a partly sectional view of the shuttle body type valve member inlet check valve assembly with flame arresting feature similar to FIG. 19, wherein now the shuttle body is at an intermediately open state.
Figure 22:
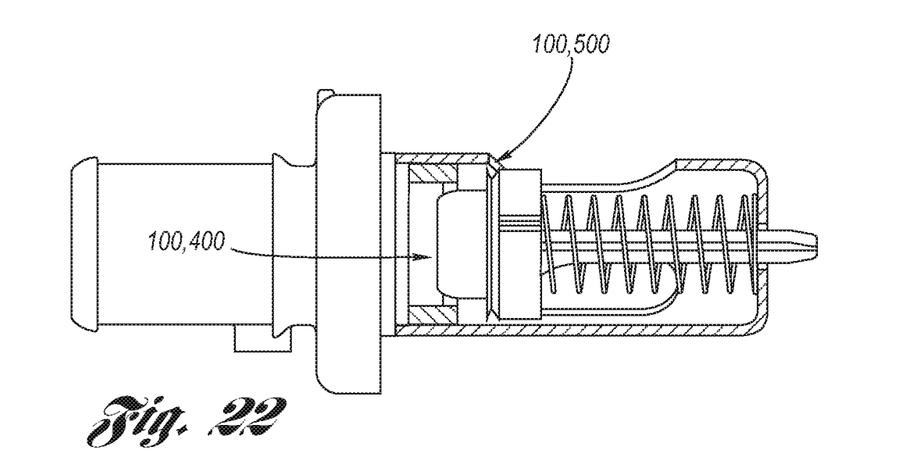
FIG. 22 is a partly sectional view of the shuttle body type valve member inlet check valve assembly with flame arresting feature, wherein the shuttle body is at an intermediately open state and both internal and external flame arresting features are provided.

Referring now to the Drawings, FIGS. 4 through 22 depict examples of an inlet check valve assembly with flame arresting feature 100 according to the present invention, wherein FIG. 4 represents a schematic timeline example of operation of the present invention, FIGS. 5 through 9 depict a flapper type valve member inlet check valve assembly with internal flame arresting feature 200, FIGS. 10 through 12 depict a flapper type valve member inlet check valve assembly with external flame arresting feature 300, FIG. 13 depicts a flapper type valve member inlet check valve assembly with internal and external flame arresting features 200, 300, FIGS. 14 through 17 depict a shuttle body type valve member inlet check valve assembly with internal flame arresting feature 400, FIGS. 18 through 21 depict a shuttle body type valve member inlet check valve assembly with external flame arresting feature 500, and FIG. 22 depicts a shuttle body type valve member inlet check valve assembly with internal and external flame arresting features 400, 500.

In view of the foregoing discussion of the science of combustion and flame front arresting, the principle of flame arresting (or quenching) provided by the inlet check valve assembly with flame arresting feature 100 is as follows, reference being directed particularly to FIG. 4.

In FIG. 4 an exemplar timeline 80 is depicted in which time 82 moves from left to right. A valve member of an inlet check valve assembly moves from a fully closed state at time 84 to a predetermined intermediately open state at time 90 in response to combustion of a fuel and air mixture in the fuel fill pipe, wherein the fuel to air ratio in the fuel fill pipe is such as to support initial combustion as required by the stoichiometry of reaction of the fuel with air, and wherein the mixture is considered for the time duration 92 to be combustible. However, for any movement of the valve member between the intermediately open state at time 90 and the fully open state, the fuel to air ratio in the fuel fill pipe is such that combustion cannot be supported, as per the stoichiometry of the fuel and air mixture, whereby the mixture has become noncombustible for future time 94.

In accordance with the internal flame arresting feature of the present invention, a flame arrester body is attached to the valve member, wherein the flame arrester body protrudes into the throat, as per a flame arresting length relative to a throat mouth of the throat. The flame arrester body is configured such that for movement of the valve member between its fully closed state and the intermediately open state, the separation distance between the flame arrester body and the throat is spatially limited to less than the minimum flame propagation distance of the fuel and air mixture until at least time 90, preferably until a time 88 as a built-in safety factor, such that any flame passing from the fuel fill pipe will be quenched at the flame arrester body and not be able to reach the fuel in the fuel tank. In this regard, the time duration of the episode from beginning to when the fuel and air mixture transitions from a combustible mixture to a noncombustible mixture cannot exceed the time duration for the valve member to move from the fully closed state to the intermediately open state, this being determined, for example, by modeling or empirical testing.

In accordance with the external flame arresting feature of the present invention, a hood is disposed concentrically with respect to the valve body and separated therefrom along a separation length. The hood is configured such that for movement of the valve member between its fully closed state and the intermediately open state, the separation between the valve member and the hood is spatially limited to less than the minimum flame propagation distance of the fuel and air mixture until at least time 90, preferably until a time 88 as a built-in safety factor, such that any flame passing from the fuel fill pipe will be quenched at the flame arrester body and not be able to reach the fuel in the fuel tank. In this regard, the time duration of the episode from beginning to when the fuel and air mixture transitions from a combustible mixture to a noncombustible mixture cannot exceed the time duration for the valve member to move from the fully closed state to the intermediately open state, this being determined, for example, by modeling or empirical testing.

Accordingly, for the critical duration of time when the ratio of fuel to air of the mixture is such that combustion of a combustible mixture may exist in the fuel fill pipe, starting from when an ignition source is first introduced and the valve member initially unseats from the closed state, to when the fuel to air ratio of the mixture is such that it transitions into a noncombustible mixture and the valve member is at the intermediately open state, the separation between the flame arrester body and the throat, and/or the separation between the valve member and the hood, is less than the minimum flame propagation distance.

Thus, it is seen that the inlet check valve with flame arresting feature according to the present invention is configured to provide less than the minimum flame propagation distance between the flame arrester body and the throat, and/or between the valve member and the hood, along a predetermined flame arresting length, which as per the known opening speed (movement) of the valve member in relation to the throat and/or hood, provides assured extinguishment of any flame front coming thereto from the fuel fill pipe. The flame arresting feature 100 in conjunction with movement of the valve body in relation to the throat, and/or the hood, is customized to the mated fuel fill pipe configuration and the stoichiometry of the fuel and air mixture so as to ensure extinguishment of any flame front occurring in a predetermined "worst case" scenario within the fuel fill pipe. As such, the present invention critically delays the opening time of fluidic communication through the inlet check valve with flame arresting feature 100 to less than the minimum flame propagation distance during at least the critical time in which combustion of a combustible fuel and air mixture may exist in the fuel fill pipe.

Figure 5:
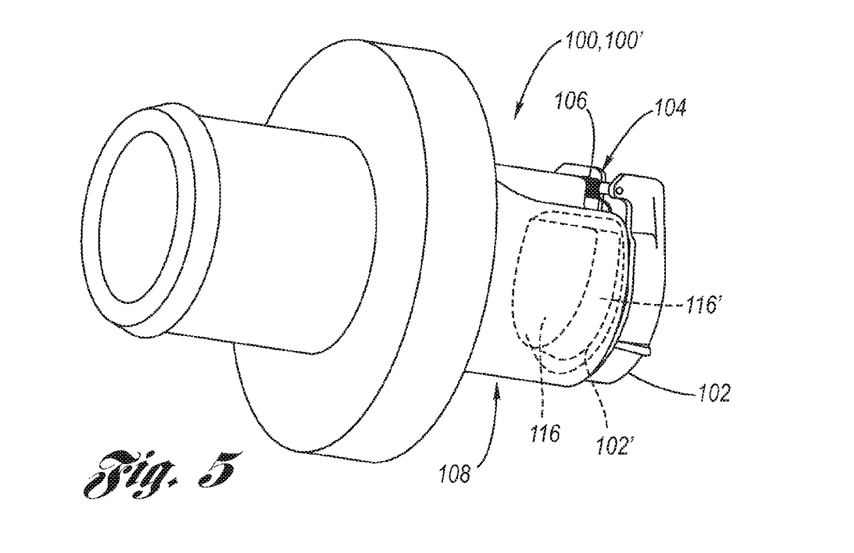
FIG. 5 is a perspective view of a flapper type valve member inlet check valve assembly with flame arresting feature according to the present invention, wherein an internal flame arresting feature is depicted.
Figure 6:
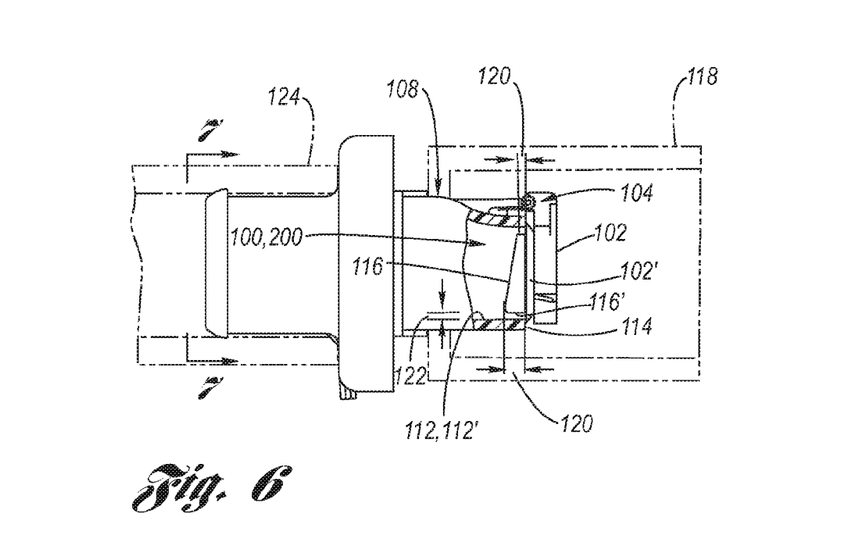
FIG. 6 is a partly sectional view of the flapper type valve member inlet check valve assembly with flame arresting feature of FIG. 5, wherein the flapper is shown at the closed state.

Referring now to FIGS. 5 though 13, a flapper type valve member inlet check valve assembly with internal and external flame arresting features 200, 300 are depicted. The valve member is a flapper (or valve door) 102 which carries a seal 102'. The flapper 102 is rotatably (or pivotally) mounted via a pivot 104 connected with a valve tube 108. Connected to the valve tube 108 is a throat 112 which terminates at a throat mouth 114. The flapper 102 is biased by a biasing agency, such as a spring 106, towards a fully closed state, as for example shown at FIGS. 5 and 6, in which the seal 102' seals in relation to the throat mouth 114. The flapper 102 rotates (or pivots) on the pivot 104 from the fully closed state to a fully open state, as shown at FIG. 9, in response to flow pressure of fuel 110 during a refueling episode, and then biasingly returns to the fully closed state when the refueling episode has concluded via urging by the spring 106. A shroud 118, shown in phantom at FIG. 6, may be disposed concentrically in relation to the valve tube 108 at the fuel tank side of the inlet check valve assembly with flame arresting feature.

Figure 7:
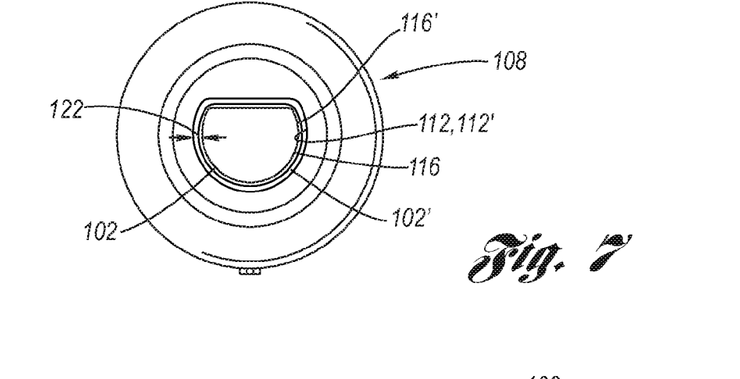
Figure 8:
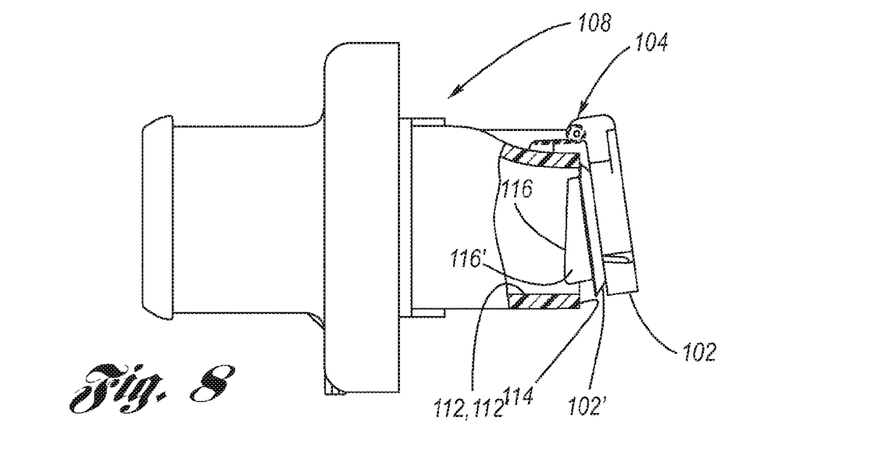
FIG. 8 is a partly sectional view of the flapper type valve member inlet check valve assembly with flame arresting feature similar to FIG. 6, wherein now the flapper is at an intermediately open state.

Referring next with more particularity to FIGS. 6 through 9, a flapper type valve member inlet check valve assembly with internal flame arresting feature 200 is depicted. The flapper 102 has connected thereto, integrally or otherwise, a flame arrester body 116 which protrudes from the flapper into the throat 112 when the flapper is at the fully closed state. The flame arrester body 116 has a flame arresting length 120 (preferably in this example being shortest adjacent the pivot 104 and longest diametrically opposite the pivot) with respect to the throat mouth 114 when the flapper 102 is at the fully closed state, wherein an outside surface 116' of the flame arrester body is configured in relation to both the inside surface 112' of the throat 112 and the pivotal movement of the flapper 102 relative to the throat such that the separation distance 122 between the flame arrester body 116, as per its outside surface 116', and the throat 112, as per its inside surface 112', is less than the minimum flame propagation distance of the fuel and air mixture, for movement of the flapper between the closed state and an intermediately open state, as shown at FIG. 7. The intermediately open state, as discussed above, is timed to occur not sooner than the occurrence of the transition from combustibility to noncombustibility of the fuel and air mixture in the fuel fill pipe 124, which is shown in phantom at FIG. 6.

Thus, for flapper type inlet check valve assemblies with internal flame arresting feature 200, it is seen that the flame arresting length 120 in association with the separation distance between the outside surface 116' of the flame arrester body 116 with respect to the inside surface 112' of the throat 112 and the rate at which the flapper moves, critically regulates the opening of fluidic communication through the inlet check valve assembly with flame arresting feature 200 to less than the minimum flame propagation distance of the mixture during the critical time in which combustion of a combustible mixture may exist in the fuel fill pipe so that, concomitantly, any flame front in the fuel fill pipe will be extinguished at the separation between the flame arrester body 116 and the throat 112.

Referring next with more particularity to FIGS. 10 through 12, a flapper type valve member inlet check valve assembly with external flame arresting feature 300 is depicted. A hood 140 is disposed concentrically adjacent the flapper 102 with respect to the perimeter 102" thereof. The hood 140 has a concave inner hood surface 146 which is shaped with respect to the pivoting of the flapper such that the separation distance 142 between the hood and the flapper remains less than the minimum flame propagation distance over a flame arresting length 144 for movement of the flapper between the closed state and an intermediately open state, as shown at FIG. 12. The intermediately open state, as discussed above, is timed to occur not sooner than the occurrence of the transition from combustibility to noncombustibility of the fuel and air mixture in the fuel fill pipe 124, which is shown in phantom at FIG. 10.

Thus, for flapper type inlet check valve assemblies with external flame arresting feature 300, it is seen that the flame arresting length 144 in association with the separation distance between the perimeter 102" of the flapper 102 with respect to the inner hood surface 146 of the hood 140 and the rate at which the flapper moves, critically regulates the opening of fluidic communication through the inlet check valve assembly with flame arresting feature 300 to less than the minimum flame propagation distance of the mixture during the critical time in which combustion of a combustible mixture may exist in the fuel fill pipe so that, concomitantly, any flame front in the fuel fill pipe will be extinguished at the separation between the flapper 102 and the hood 140.

With regard to a flapper type inlet check valve assembly with both internal and external flame arresting features 200, 300, the mass of the flapper 102 and the bias force of the spring 106 may be adjusted to enhance performance by "tuning" the lag time of opening, as well as for robustness.

FIG. 13 depicts a flapper type inlet check valve assembly with both internal and external flame arresting features 200, 300, each as described hereinabove and acting in simultaneity.

Figure 14:
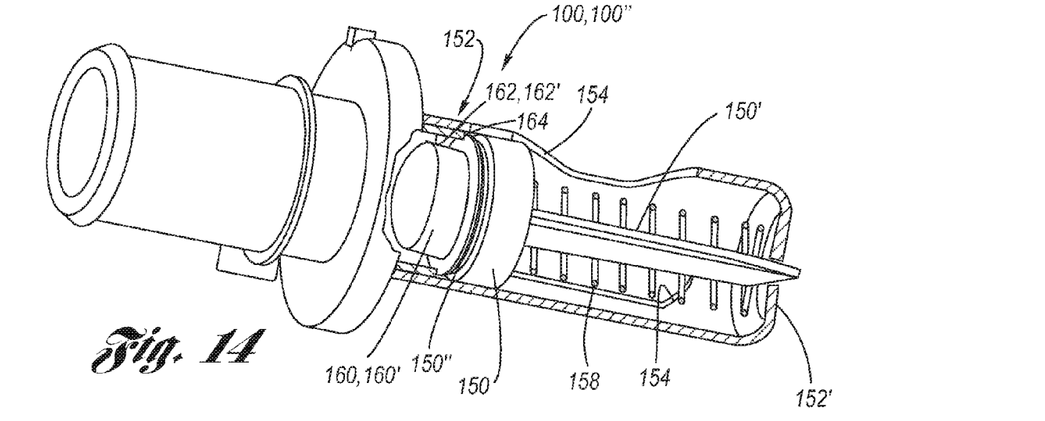
FIG. 14 is a perspective view of a shuttle body type valve member inlet check valve assembly with flame arresting feature according to the present invention, wherein an internal flame arresting feature is depicted.
Figure 15:
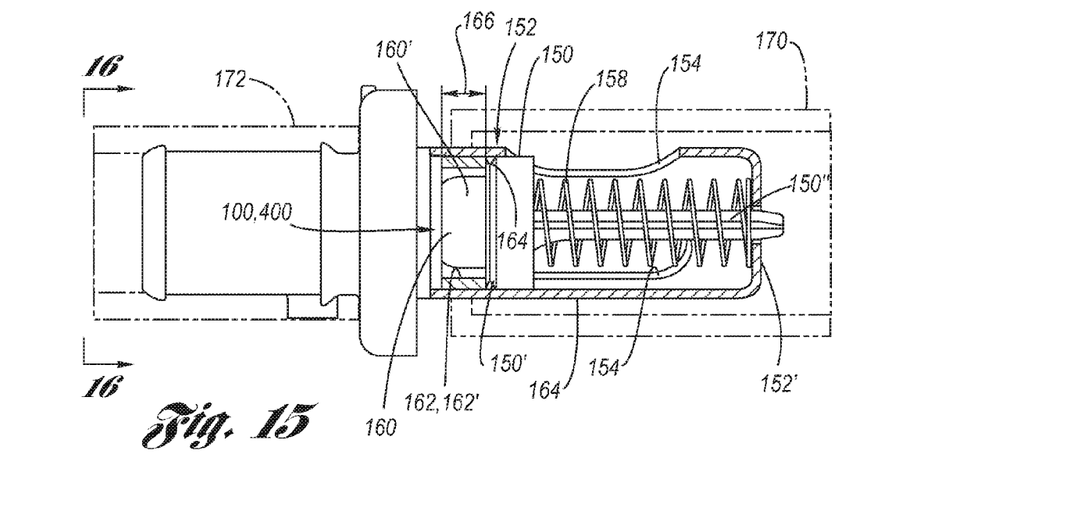
FIG. 15 is a partly sectional view of the shuttle body type valve member inlet check valve assembly with flame arresting feature of FIG. 14, wherein the shuttle body is shown at the closed state.
Figure 16:
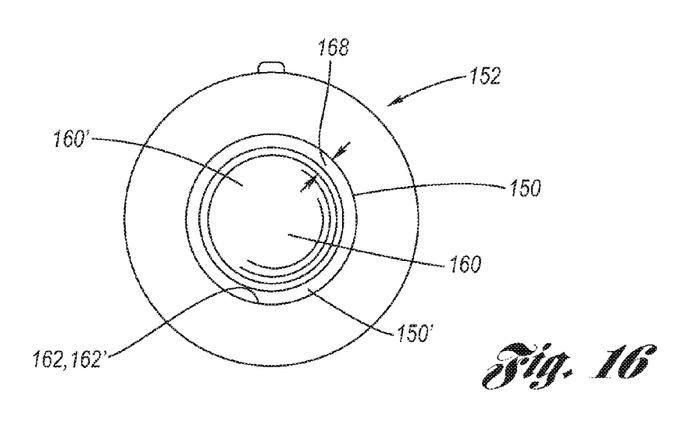
FIG. 16 is an end view, seen along line 16-16 of FIG. 15.

Referring now to FIGS. 14 though 22, a shuttle body type valve member inlet check valve assembly with internal and external flame arresting features 400, 500 are depicted. The valve member is a shuttle body (or valve plunger) 150 which carries a seal 150'. A valve tube 152 has a plurality of fuel dispensing apertures 154 and guidingly receives a guide bar 150" of the shuttle body 150 at a partly closed distal end 152'. Connected to the valve tube 152 is a throat 162 which terminates at a throat mouth 164. The shuttle body 150 axially moves (slides) in the valve tube 152 relative to the throat 162 between a fully closed state whereat the seal 150' seals in relation to the throat mouth 164, as shown at FIGS. 14 through 16, and a fully open state, as shown at FIG. 18. In response to flow pressure of fuel 156 during a refueling episode, the shuttle body 150 moves from the fully closed state to the fully open state against the biasing of a biasing agency, such as a spring 158, then returns to the fully closed state due to biasing of the spring. A shroud 170, shown in phantom at FIG. 15, may be disposed concentrically in relation to the valve tube 152 at the fuel tank side of the inlet check valve assembly with flame arresting feature.

Figure 17:
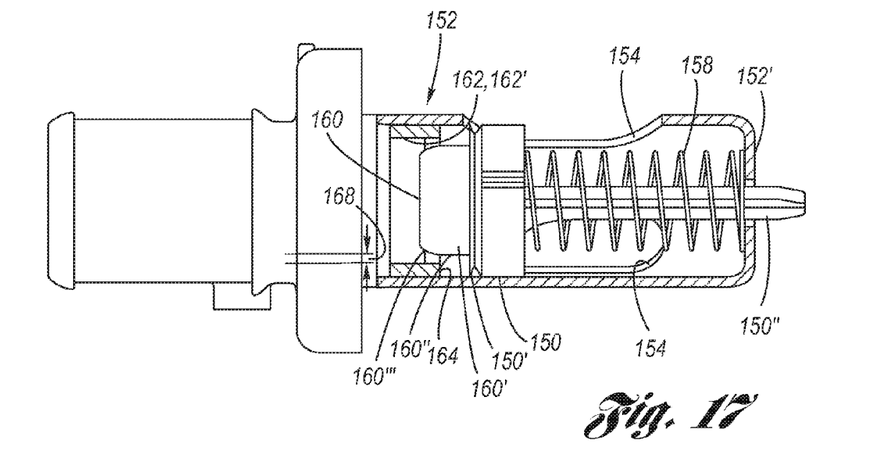
FIG. 17 is a partly sectional view of the shuttle body type valve member inlet check valve assembly with flame arresting feature similar to FIG. 15, wherein now the shuttle body is at an intermediately state.
Figure 18:
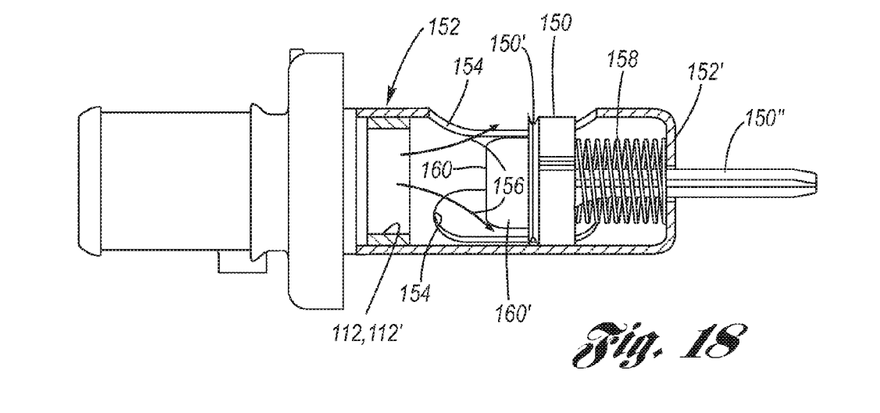
FIG. 18 is a partly sectional view of the shuttle body type valve member inlet check valve assembly with flame arresting feature similar to FIG. 15, wherein now the shuttle body is at a fully open state.

Referring next with more particularity to FIGS. 14 through 18, a shuttle body type valve member inlet check valve assembly with internal flame arresting feature 400 is depicted. The shuttle body 150 has connected thereto, integrally or otherwise, a flame arrester body 160 which protrudes from the shuttle body into the throat 162 when the shuttle body is at the fully closed state. The flame arrester body 160 has a flame arresting length 166 (in this example being generally uniform) with respect to the throat mouth 164 when the shuttle body 150 is at the fully closed state, wherein an outside surface 160' of the flame arrester body is configured in relation to both the inside surface 162' of the throat 162 and the axially sliding movement of the shuttle body 150 relative to the throat such that the separation distance 168 between the flame arrester body 160, as per its outside surface 160', and the throat 162, as per its inside surface 162', is less than the minimum flame propagation distance of the fuel and air mixture during movement of the shuttle body between the closed state and an intermediately open state, as shown at FIG. 17. The intermediately open state, as discussed above, is timed to occur not sooner than the occurrence of the transition from combustibility to noncombustibility of the fuel and air mixture in the fuel fill pipe 172, which is shown in phantom in FIG. 15.

Thus, for shuttle body type inlet check valve assemblies with internal flame arresting feature 400, it is seen that the flame arresting length 166 in association with the separation distance 168 between the outside surface 160' of the flame arrester body 160 with respect to the inside surface 162' of the throat 162 and the rate at which the shuttle body moves, critically regulates the opening of fluidic communication through the inlet check valve assembly with flame arresting feature 400 to less than the minimum flame propagation distance of fuel to air of the mixture for the critical time in which combustion of a combustible mixture may exist in the fuel fill pipe so that, concomitantly, any flame front in the fuel fill pipe will be extinguished at the separation between the flame arrester body 160 and the throat 162.

Figure 19:
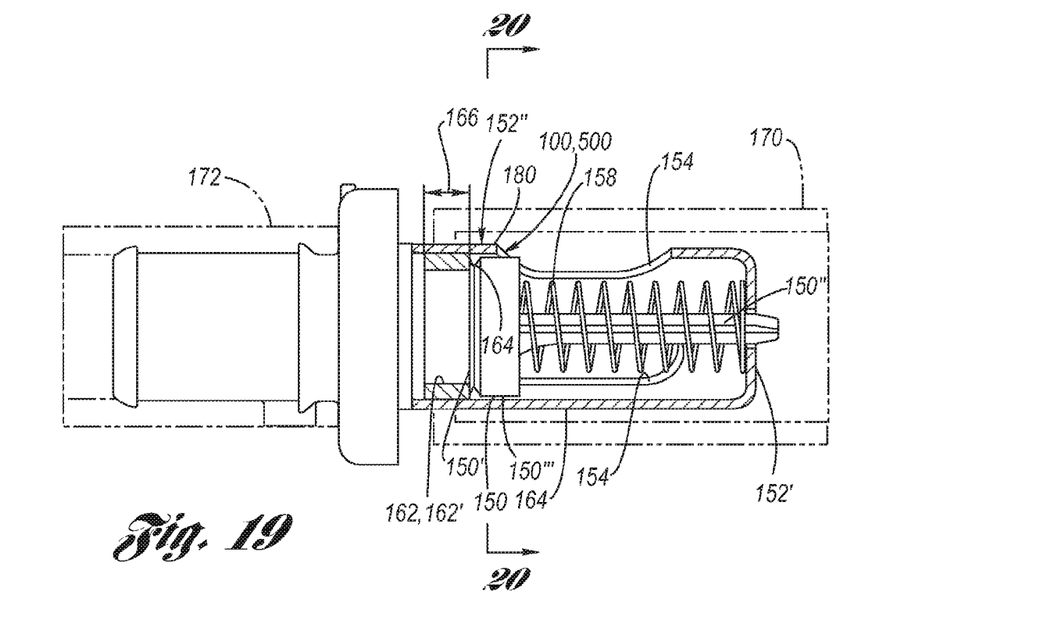
FIG. 19 is a partly sectional view of the shuttle body type valve member inlet check valve assembly with flame arresting feature, wherein an external flame arresting feature is depicted and the shuttle body is shown at the closed state.

Referring next with more particularity to FIGS. 19 through 21, a shuttle body type valve member inlet check valve assembly with external flame arresting feature 500 is depicted. The valve tube 152" is now configured to provide a hood 180 which is disposed concentrically adjacent the shuttle body 150 with respect to the perimeter 150" thereof. The hood 180 has an inner surface 186 which is shaped with respect to the sliding of the shuttle body such that the separation distance 182 between the hood and the shuttle body remains less than the minimum flame propagation distance over a flame arresting length 184 for movement of the shuttle body between the closed state and an intermediately open state, as shown at FIG. 21. The intermediately open state, as discussed above, is timed to occur not sooner than the occurrence of the transition from combustibility to noncombustibility of the fuel mixture in the fuel fill pipe 172, which is shown in phantom at FIG. 19.

Thus, for shuttle body type inlet check valve assemblies with external flame arresting feature 500, it is seen that the flame arresting length 184 in association with the separation distance between the perimeter 150" of the shuttle body 150 with respect to the inner hood surface 186 of the hood 180 and the rate at which the shuttle body moves, critically regulates the opening of fluidic communication through the inlet check valve assembly with flame arresting feature 500 to less than the minimum flame propagation distance of fuel to air of the mixture during the critical time combustion of in which a combustible mixture may exist in the fuel fill pipe so that, concomitantly, any flame front in the fuel fill pipe will be extinguished at the separation between the shuttle body 150 and the hood 180.

With regard to a shuttle body type inlet check valve assembly with both internal and external flame arresting features 400, 500, the mass of the shuttle body 150 and the bias force of the spring 158 may be adjusted to enhance performance by "tuning" the lag time of opening, as well as for robustness.

FIG. 22 depicts a shuttle body type inlet check valve assembly with both internal and external flame arresting features 400, 500, each as described hereinabove and acting in simultaneity.

Hypothetical Example

A hypothetical example to illustrate the practice of the present invention is as follows (note: since this example is merely hypothetical, it does not recount an actual test or experiment). A fuel system of a flex fuel vehicle utilizes a fuel that is a blend of alcohol and gasoline, having a minimum flame propagation distance of 0.08 inches, assuming a stoichiometric fuel to air ratio of the fuel and air mixture under standard temperature and pressure conditions. During a series of external ignition episodes it is noted that it takes an average 0.15 to 0.2 seconds from beginning of combustion until the fuel to air ratio of the fuel and air mixture in the fuel refill pipe is such that the mixture transitions from a combustible mixture to noncombustible mixture. The length of the flame arresting feature, the separation distance of the flame arrester body from the throat, and/or the separation of the valve member from the hood, and the speed of movement of the valve member away from the throat in response to combustion pressure into the fuel fill pipe are collectively tuned so that from the beginning of the combustion episode, when the valve member is at the fully closed state until the valve member is at the intermediately open state, a time duration of, on average, 0.275 seconds transpires. A final production inlet check valve assembly with flame arresting feature includes a fail-safe timing factor built-in to the tuning of 0.005 seconds duration, in order to safely accommodate a "worst-case" combustion scenario in which two untoward events coincide: 1) a longest possible combustible fuel and air mixture time occurs (but never exceeds) of 0.22 seconds, and 2) a fastest possible time for the valve member movement from the fully closed state to the intermediately open state occurs (but never exceeds) of 0.225 seconds. Given that the valve member variably accelerates from rest at the beginning of the combustion episode, having an average speed 2.0 inches per second over the aforesaid shortest valve member movement time of 0.25 seconds, then the flame arresting length of the flame arrester body, and/or of the hood, would be about 0.25 inches, and the separation of the flame arrester body from the throat, and/or the separation of the valve member from the hood, is less than 0.08 inches.

It should be noted that the separation distance between the flame arrester body and the throat is identically the separation distance between the outside surface of the flame arrester body and the inside surface of the throat; it makes no difference for purposes of flame quenching whether the flame arrester body is solid or hollow.

It should be further noted that, in operation of the present invention, that while initially a stoichiometric ratio of fuel to air at standard temperature and pressure, the ratio may become progressively richer, that is, higher in fuel and lower in air, as combustion continues down the fuel fill pipe. As such, the minimum flame propagation distance is smallest at the moment of initial combustion and increases as the ratio of fuel to air increases. In accordance with this progressively increasing minimum flame propagation distance, the shape of the flame arrester body may be configured to take advantage of this changing of the fuel to air ratio. For example, the flame arrester body may be tapered, curved or otherwise shaped, or in part shaped, so as to have a smaller cross-sectional diameter with increasing distance from the throat mouth, rather than being substantially parallel with the throat (see for example at FIG. 17 first and second portions 106", 160''' of the outer surface 160'). The same principle applies to external flame arresting features utilizing a hood.

By way merely of example, the separation distance between the flame arrester body and the throat may range from about 0.05 to about 0.15 inches, depending upon the particular fuel system application. External flame arresting features utilizing a hood may also have a separation distance in this range.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An inlet check valve assembly with flame arresting feature for a fuel system, comprising:
   a throat having an inside surface and a throat mouth;
   a valve member movably disposed in relation to said throat, wherein said valve member is movable between a fully closed state with respect to said throat whereat said throat mouth is closed by said valve member and a fully open state with respect to said throat, wherein when said valve member is at other than said fully closed state, fluidic communication through said inlet check valve assembly is provided by a separation distance of said inlet check valve assembly;
   a biasing agency biasing said valve member to the fully closed state; and
   an internal flame arresting feature disposed with respect to said valve member such that between said fully closed state and an intermediately open state a predetermined said separation distance is provided thereby;
   wherein said internal flame arresting feature comprises a flame arrester body protruding into said throat when said valve member is at the fully closed state, the protruding being defined by a flame arresting length of said flame arrester body with respect to said throat mouth such that said separation distance is provided between said flame arrester body and said throat during movement of said valve member between said fully closed state and said predetermined intermediately open state with respect to said throat.

2. The inlet check valve assembly with flame arresting feature of claim 1, wherein said separation distance ranges from about 0.05 inches to about 0.15 inches.

3. The inlet check valve assembly with flame arresting feature of claim 1, further comprising:
   a valve tube connected to said throat;
   wherein said valve member comprises a flapper, said flapper being pivotally connected to said valve tube.

4. The inlet check valve assembly with flame arresting feature of claim 1, further comprising:
   a valve tube connected to said throat;
   wherein said valve member comprises a shuttle body slidably movable in guiding relation to said valve tube.

* * * * *